(12) United States Patent
Zhang et al.

(10) Patent No.: US 12,009,958 B2
(45) Date of Patent: Jun. 11, 2024

(54) METHODS AND APPARATUSES FOR TRANSMISSION AND RECEPTION OF DEMODULATION REFERENCE SIGNAL

(71) Applicant: FUJITSU LIMITED, Kawasaki (JP)

(72) Inventors: Jian Zhang, Beijing (CN); Pengyu Ji, Beijing (CN); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 596 days.

(21) Appl. No.: 17/133,001

(22) Filed: Dec. 23, 2020

(65) Prior Publication Data
US 2021/0119843 A1 Apr. 22, 2021

Related U.S. Application Data

(63) Continuation of application No. PCT/CN2018/100000, filed on Aug. 10, 2018.

(51) Int. Cl.
| | | |
|---|---|---|
| *H04W 72/04* | (2023.01) |
| *H04L 5/00* | (2006.01) |
| *H04L 27/26* | (2006.01) |
| *H04W 72/0446* | (2023.01) |
| *H04W 72/23* | (2023.01) |

(52) U.S. Cl.
CPC ........ *H04L 27/2613* (2013.01); *H04L 5/0048* (2013.01); *H04W 72/0446* (2013.01); *H04W 72/23* (2023.01)

(58) Field of Classification Search
CPC ............ H04W 72/23; H04W 72/0446; H04W 72/042; H04W 4/40; H04L 27/2613; H04L 5/0048; H04L 5/0053; H04L 1/001; H04L 1/0004; H04J 13/16

See application file for complete search history.

(56) References Cited

U.S. PATENT DOCUMENTS 10,461,908 B2 * 10/2019 Patel ..................... H04L 5/0044
11,218,269 B2 * 1/2022 Jiang ..................... H04L 1/1819
(Continued)

FOREIGN PATENT DOCUMENTS

| CN | 107872860 A | 4/2018 |
| CN | 108111266 A | 6/2018 |

(Continued)

OTHER PUBLICATIONS

Notice of Reasons for Refusal issued by the Japan Patent Office for corresponding Japanese Patent Application No. 2021-500418, dated Apr. 5, 2022, with an English translation.
Huawei et al., "Short TTI solutions for R15 sidelink", Agenda Item: 5.2.3.4.1, 3GPP TSG RAN WG1 Meeting #90, R1-1712099, Prague, Czech Republic, Aug. 21-25, 2017.
International Search Report and Written Opinion of the International Searching Authority issued for corresponding International Patent Application No. PCT/CN2018/100000, dated May 8, 2019, with an English translation.

(Continued)

*Primary Examiner* — Wei Zhao
(74) *Attorney, Agent, or Firm* — Myers Wolin, LLC

(57) ABSTRACT

Methods and apparatuses for information transmission and reception are provided. The method includes: determining a demodulation reference signal in a time-domain resource by a transmitting device at least according to the number of a part of symbols in the time-domain resource; wherein the number of symbols contained in the time-domain resource is less than or equal to the number of symbols contained in a slot or a subframe; and transmitting data information and the demodulation reference signal by the transmitting device to a receiving device by at least using the time-domain resource.

18 Claims, 7 Drawing Sheets

(56) References Cited

U.S. PATENT DOCUMENTS

| | | | | |
|---|---|---|---|---|
| 2015/0208392 | A1* | 7/2015 | Park | H04W 72/23 |
| | | | | 370/329 |
| 2016/0192385 | A1 | 6/2016 | Tooher et al. | |
| 2018/0367255 | A1* | 12/2018 | Jeon | H04W 72/23 |
| 2019/0208537 | A1 | 7/2019 | Ke et al. | |
| 2019/0349927 | A1 | 11/2019 | Qin et al. | |
| 2020/0007247 | A1* | 1/2020 | Gulati | H04B 7/0634 |

FOREIGN PATENT DOCUMENTS

| | | | |
|---|---|---|---|
| CN | 108111273 | A | 6/2018 |
| CN | 108347325 | A | 7/2018 |
| WO | 2017/079530 | A1 | 5/2017 |

OTHER PUBLICATIONS

Qualcomm, "Remaining issues on NR DM-RS", Agenda item: 7.2.3.3, 3GPP TSG RAN WG1 Meeting 90bis, R1-1718810, Oct. 9-13, 2017, Prague, Czech Republic.

AT&T, "Remaining details for DMRS design", Agenda item: 7.2.3.3, 3GPP TSG RAN WG1 Meeting 91, R1-1719637, Nov. 27-Dec. 1, 2017, Reno, USA.

First Notification of Office Action and Search Report issued by the China National Intellectual Property Administration for corresponding Chinese Patent Application No. 201880094448.0, dated May 5, 2023, with an English translation.

* cited by examiner

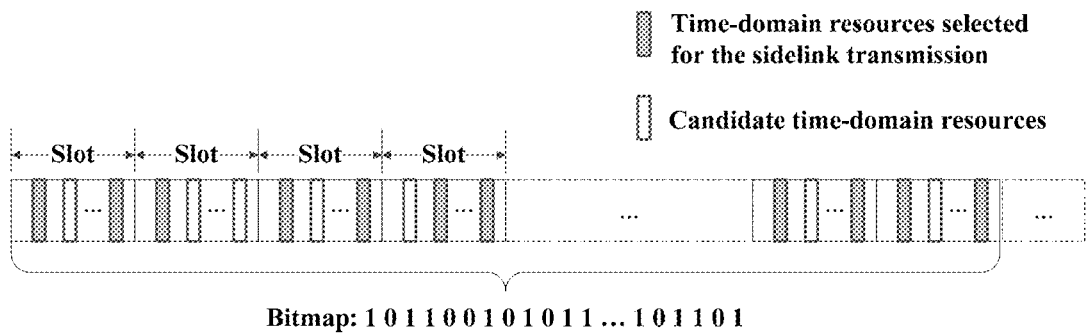
Fig. 12
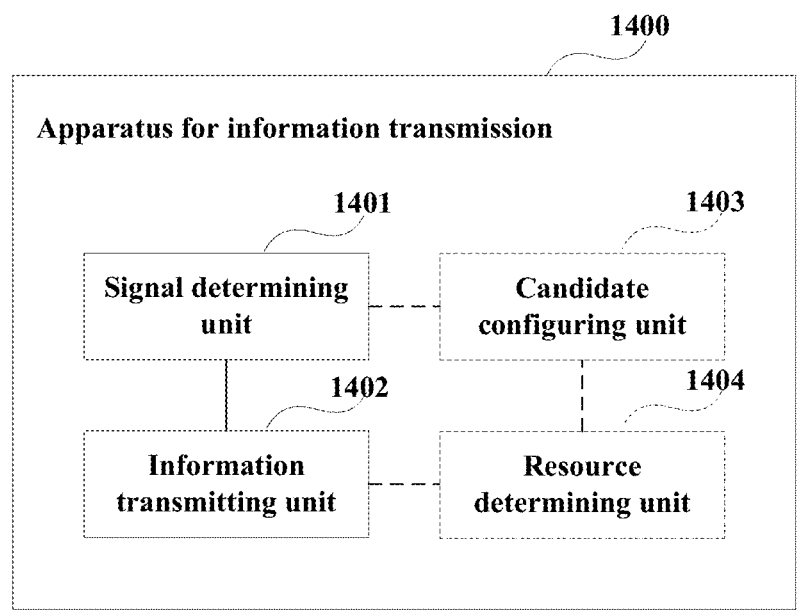
Fig. 13
Fig. 14

METHODS AND APPARATUSES FOR TRANSMISSION AND RECEPTION OF DEMODULATION REFERENCE SIGNAL

CROSS REFERENCE TO RELATED APPLICATIONS

This application is a continuation application of International Application No PCT/CN2018/100000 filed on Aug. 10, 2018, the contents of which are incorporated herein by reference.

TECHNICAL FIELD

This disclosure relates to the field of communication technologies, and in particular to methods and apparatuses for information transmission and reception.

BACKGROUND

The Vehicle to Everything (V2X) in a long term evolution (LTE) system is a vehicle communication technology that is able to support communications between vehicles and vehicles, vehicles and roadside units, and vehicles and pedestrians.

A transmitting device in V2X may transmit data directly to a receiving device via a directly connected sidelink, that is, data need not to be relayed via a network device, such as a base station. A sidelink is a new air interface that provides a directly connected channel for communications between a transmitting device and a receiving device.

LTE V2X is based on an LTE architecture. For example, a sidelink may only use LTE uplink subframes, and the sidelink may perform data transmission in units of subframes, which may achieve coexistence and compatibility with LTE cellular communications, and may meet such service demands as basic road safety, and road condition warnings, etc.

With the emergence of new services and new scenarios, such as remote driving, autonomous driving, and real-time information exchange, etc., future V2X needs to meet higher service requirements and technical specifications. For example, remote driving requires lower communication latency to ensure instantaneity, and higher data transmission reliability is needed to ensure safety, real-time video exchange requires low latency, and at the same time, higher data transmission rates are required, etc.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in some scenarios, such as V2X, data scheduling needs to be performed at a length less than a subframe or a slot (which may be referred as non-slot or mini-slot). However, there currently exists no technical solution for how to perform transmission and reception of data information.

Addressed to at least one of the above problems, embodiments of this disclosure provide methods and apparatuses for information transmission and reception.

According to a first aspect of the embodiments of this disclosure, there is provided a method for information transmission, including:
  determining a demodulation reference signal in a time-domain resource by a transmitting device at least according to the number of a part of symbols in the time-domain resource; wherein the number of symbols contained in the time-domain resource is less than or equal to the number of symbols contained in a slot or a subframe; and
  transmitting data information and the demodulation reference signal by the transmitting device to a receiving device by at least using the time-domain resource.

According to a second aspect of the embodiments of this disclosure, there is provided an apparatus for information transmission, including:
  a signal determining unit configured to determine a demodulation reference signal in a time-domain resource at least according to the number of a part of symbols in the time-domain resource; wherein the number of symbols contained in the time-domain resource is less than or equal to the number of symbols contained in a slot or a subframe; and
  an information transmitting unit configured to transmit data information and the demodulation reference signal to a receiving device by at least using the time-domain resource.

According to a third aspect of the embodiments of this disclosure, there is provided a method for information reception, including:
  receiving, by a receiving device, data information and a demodulation reference signal transmitted by a transmitting device by at least using a time-domain resource;
  wherein, the demodulation reference signal is determined at least according to the number of a part of symbols in the time-domain resource, and the number of symbols contained in the time-domain resource is less than or equal to the number of symbols contained in a slot or a subframe.

According to a fourth aspect of the embodiments of this disclosure, there is provided an apparatus for information reception, including:
  an information receiving unit configured to receive data information and a demodulation reference signal transmitted by a transmitting device by at least using a time-domain resource;
  wherein, the demodulation reference signal is determined at least according to the number of a part of symbols in the time-domain resource, and the number of symbols contained in the time-domain resource is less than or equal to the number of symbols contained in a slot or a subframe.

According to a fifth aspect of the embodiments of this disclosure, there is provided a communication system, including:
  a transmitting device including the apparatus for information transmission as described in the second aspect; and
  a receiving device including the apparatus for information reception as described in the fourth aspect.

An advantage of the embodiments of this disclosure exists in that the transmitting device determines a demodulation reference signal in a time-domain resource at least according to the number of a part of symbols in the time-domain resource; wherein the number of symbols contained in the time-domain resource is less than or equal to the number of symbols contained in a slot or a subframe. Hence, data information transmission of non-slot may be supported.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

FIG. 12 is an exemplary diagram of determining a time-domain resource of an embodiment of this disclosure;

FIG. 13 is a schematic diagram of a method for information reception of an embodiment of this disclosure;

FIG. 14 is a schematic diagram of an apparatus for information transmission of an embodiment of this disclosure;

DETAILED DESCRIPTION

Figure 1:
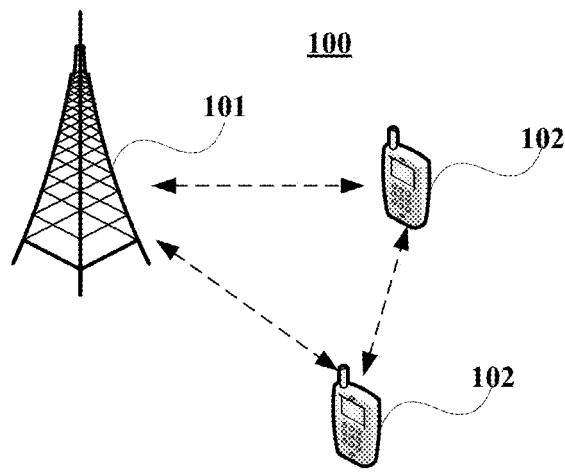
FIG. 1 is a schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a dedicated geographical area. And a term "cell" may refer to a base station and/or its coverage area, which is dependent on a context of the term.

In the embodiments of this disclosure, the term "user equipment (UE)" or "terminal equipment (TE) or terminal device" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipments described above.

Scenarios in the embodiments of this disclosure shall be described below by way of examples; however, this disclosure is not limited thereto.

FIG. 1 is a schematic diagram of a communication system of an embodiment of this disclosure, in which a case where terminal equipments and a network device are taken as examples is schematically shown. As shown in FIG. 1, a communication system 100 may include a network device 101 and terminal equipments 102. For the sake of simplicity, an example having only two terminal equipments and one network device is schematically given in FIG. 1; however, the embodiment of this disclosure is not limited thereto.

In the embodiment of this disclosure, existing traffics or traffics that may be implemented in the future may be performed between the network device 101 and the terminal equipment 102. For example, such traffics may include but not limited to an enhanced mobile broadband (eMBB), massive machine type communication (MTC), and ultra-reliable and low-latency communication (URLLC), etc.

It should be noted that FIG. 1 shows that two terminal equipments 102 are both within a coverage of the network device 101. However, this disclosure is not limited thereto, and the two terminal equipments 102 may not be within the coverage of the network device 101, or one terminal equipment 102 is within the coverage of the network device 101 and the other terminal equipment 102 is outside the coverage of the network device 101.

In the embodiments of this disclosure, sidelink transmission may be performed between two terminal equipments 102. For example, the two terminal equipments 102 may both perform sidelink transmission within the coverage of the network device 101 to implement V2X communications, or both of them may perform sidelink transmission outside the coverage of the network device 101 to implement V2X communications, and it may also be that one terminal equipment 102 is within the coverage of the network device 101 and another terminal equipment 102 is outside the coverage of the network device 101 and perform sidelink transmission to implement V2X communications.

According to the requirement documents of the 3rd Generation Partnership Project (3GPP), for certain application scenarios, a maximum peer-to-peer latency that V2X can tolerate in the future needs to be as low as several milliseconds (such as 3 milliseconds). In contrast, a minimum granularity of LTE V2X sidelink data transmission is as high as 1 millisecond (1 subframe), and its requirement for latency is usually on the order of ten milliseconds and hundred milliseconds. Therefore, the LTE V2X with subframes as a transmission granularity will not be able to meet the above requirement on low latency.

In addition, a more flexible slot format is introduced into New Radio (NR) systems of 5G, and a change of directions of uplink and downlink transmission may occur within a subframe or slot, that is, resources in a subframe or slot are not all uplink resources. For example, when V2X and a cellular system work at the same frequency, as only uplink resources may be used by a sidelink, if only a subframe or a slot is used as a transmission granularity, the LTE V2X will not be able to use a subframe or slot having only partial uplink resources, which will greatly increase waiting time of sidelink transmission, and is not conducive to meeting the requirement on low latency.

Therefore, there is a need to perform transmission and reception of sidelink data and/or control information at a resource granularity smaller than a subframe or slot (which may also be referred to as non-slot or mini-slot), so as to meet demands for more low latency requirements. The embodiments of this disclosure shall be described by taking a sidelink and V2X as examples; however, this disclosure is not limited thereto.

Embodiment 1

The embodiments of this disclosure provide a method for information transmission, which are described from a transmitting device side. The transmitting device may be a terminal equipment; however, this disclosure is not limited thereto, and, for example, it may also be a network device.

Figure 2:
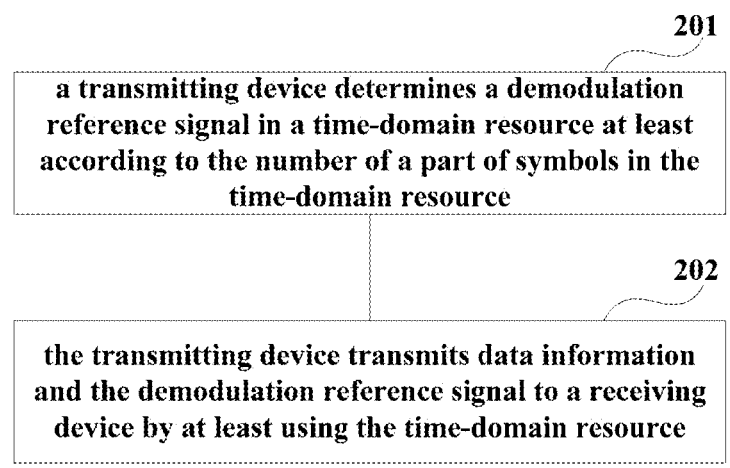
FIG. 2 is a schematic diagram of a method for information transmission of an embodiment of this disclosure.

FIG. 2 is a schematic diagram of a method for information transmission of the embodiment of this disclosure. As shown in FIG. 2, the method includes:

step 201: a transmitting device determines a demodulation reference signal in a time-domain resource at least according to the number of a part of symbols in the time-domain resource; and step 202: the transmitting device transmits data information and the demodulation reference signal to a receiving device by at least using the time-domain resource.

In the embodiments of this disclosure, the number of symbols contained in the time-domain resource is less than or equal to the number of symbols contained in a slot or a subframe, and the number of symbols contained in a slot or a subframe may be, for example, 14; however, this disclosure is not limited thereto.

In the embodiments of this disclosure, for example, waveforms, such as orthogonal frequency division multiplex (OFDM), single-carrier frequency division multiple access (SC-FDMA), or discrete Fourier transform spread orthogonal frequency division multiplex (DFT-s-OFDM), may be used, hence, the above symbols may be such symbols as OFDM, or SC-FDMA or DFT-s-OFDM, etc., which are hereinafter referred to as symbols; however, this disclosure is not limited thereto.

In an embodiment, the time-domain resource may be used for transmission or reception of sidelink information; however, this disclosure is not limited thereto. Following description shall be given by taking a sidelink and V2X as examples.

Non-slot resources may be used to transmit and receive data information, such as a PSSCH (physical sidelink shared channel); and it may also be used to transmit and receive control information, such as a PSCCH (physical sidelink control channel). In the embodiments of this disclosure, non-slot time-domain resources (such as symbols) shall be mainly describes, but non-slot frequency domain resources are not limited. Frequency-domain resources may be configured by the network device, or may also be pre-configured. And furthermore, the embodiments of this disclosure may be applicable to different subcarrier intervals, such as 15 KHz, 30 KHz, 60 KHz, 120 KHz, etc.; however, this disclosure is not limited thereto.

In an embodiment, the time-domain resources include: one or more symbols occupied by the data information, and one or more symbols occupied by the demodulation reference signal (DM-RS). Alternatively, the time-domain resource further includes at least one symbol used for automatic gain control (AGC) and/or at least one symbol taken as a guard period.

For example, suppose that a time-domain resource used for one time of V2X sidelink transmission includes N symbols, and last E symbols need to be taken as guard periods for transmission and reception switching between sidelinks, or transmission and reception switching between a sidelink and a cellular link; and former-most F symbols need to be used for automatic gain control.

For LTE V2X, it takes a subframe as a granularity of sidelink resource allocation. A subframe contains 14 symbols, that is, N=14; a first symbol and a last symbol are respectively used for AGC and a guard period, that is, E=F=1; and symbol positions where demodulation reference signals (DM-RSs) used for PSCCH and PSSCH demodulation are located are fixed, located at symbols #2, #5, #8, #11 (the 14 symbols are numbered in accordance with #0 to #13).

However, when non-slot is used as a granularity of sidelink resource allocation, the number of symbols contained in non-slot is variable, hence, symbol positions of DM-RSs also change along with a length of non-slot, and symbol positions of DM-RSs of LTE V2X cannot be used.

In an embodiment, the number of a part of symbols in the time-domain resource is the number of symbols in the time-domain resource except at least one symbol used for automatic gain control and/or at least one symbol taken as a guard period. For example, the transmitting device may determine the number of symbols occupied by the demodulation reference signal and positions of the symbols where they are located in the time-domain resource at least according to the number of symbols in the time-domain resource except the at least one symbol used for automatic gain control and/or the at least one symbol taken as a guard period.

It should be noted that following description shall be given by taking the number of symbols of the DM-RS and symbol positions thereof as examples; however, this disclosure is not limited thereto. For example, the transmitting device may also determine a sequence, cyclic shift, a frequency domain position, and an orthogonal cover code (OCC), etc., of the demodulation reference signal in the time-domain resource at least according to the number of a part of symbols in the time-domain resource.

Figure 3:
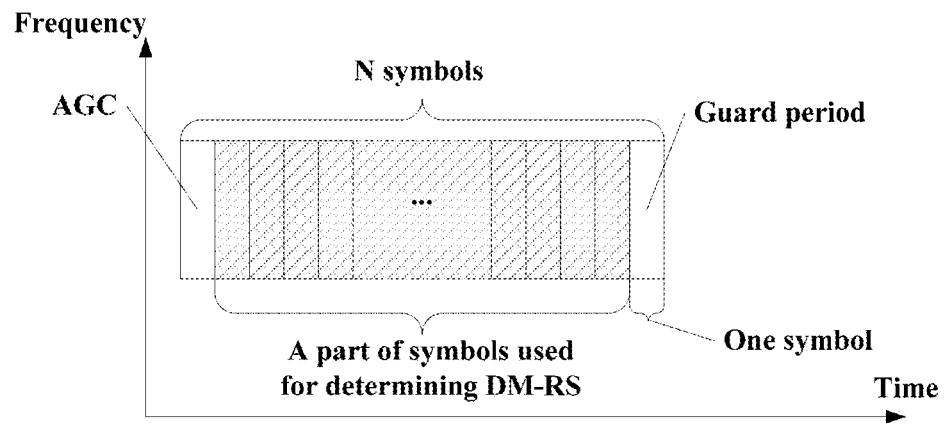
FIG. 3 is a schematic diagram of a time-domain resource of an embodiment of this disclosure.

FIG. 3 is a schematic diagram of the time-domain resource of the embodiment of this disclosure. As shown in FIG. 3, assuming that non-slot used for sidelink transmission at one time contains N symbols, the DM-RS is located symbols other than last E (E≥0) symbols (it is assumed that E=1 in FIG. 3) and former-most F (F≥0) symbols (it is assumed that F=1 in FIG. 3), and a position of the DM-RS is in dependence on a part of symbols of a number D=N-E-F. And F=0 shows that there exists no guard period.

In an embodiment, the number of symbols occupied by the demodulation reference signal and the positions of the symbols where they are located are determined according to parameters D, C and Δ; where, D is the number of a part of symbols in the time-domain resource, C is a number parameter of the demodulation reference signal, and Δ denotes offset taking symbol as a unit.

For example, the positions of the symbols of the DM-RS may be determined by using a lookup table. Table 1 is an example of a lookup table used for determining the DM-RS of the embodiment of this disclosure.

TABLE 1

| Number of a part of symbols (D) | Number parameters of DM-RSs (C) | | | |
|---|---|---|---|---|
| | 0 | 1 | 2 | 3 |
| <4 | $l_0 + \Delta_{0,0}$ | $l_0 + \Delta_{0,1}$ | $l_0 + \Delta_{0,2}$ | $l_0 + \Delta_{0,3}$ |
| 4 | $l_0 + \Delta_{4,0}$ | $l_0 + \Delta_{4,1}$ | $l_0 + \Delta_{4,2}$ | $l_0 + \Delta_{4,3}$ |
| 5 | $l_0 + \Delta_{5,0}$ | $l_0 + \Delta_{5,1}$, $4 + \Delta_{5,1}$ | $l_0 + \Delta_{5,2}$, $4 + \Delta_{5,2}$ | $l_0 + \Delta_{5,3}$, $4 + \Delta_{5,3}$ |
| 6 | $l_0 + \Delta_{6,0}$ | $l_0 + \Delta_{6,1}$, $4 + \Delta_{6,1}$ | $l_0 + \Delta_{6,2}$, $4 + \Delta_{6,2}$ | $l_0 + \Delta_{6,3}$, $4 + \Delta_{6,3}$ |
| 7 | $l_0 + \Delta_{7,0}$ | $l_0 + \Delta_{7,1}$, $4 + \Delta_{7,1}$ | $l_0 + \Delta_{7,2}$, $4 + \Delta_{7,2}$ | $l_0 + \Delta_{7,3}$, $4 + \Delta_{7,3}$ |
| 8 | $l_0 + \Delta_{8,0}$ | $l_0 + \Delta_{8,1}$, $6 + \Delta_{8,1}$ | $l_0 + \Delta_{8,2}$, $3 + \Delta_{8,2}$, $6 + \Delta_{8,2}$ | $l_0 + \Delta_{8,3}$, $3 + \Delta_{8,3}$, $6 + \Delta_{8,3}$ |
| 9 | $l_0 + \Delta_{9,0}$ | $l_0 + \Delta_{9,1}$, $6 + \Delta_{9,1}$ | $l_0 + \Delta_{9,2}$, $3 + \Delta_{9,2}$, $6 + \Delta_{9,2}$ | $l_0 + \Delta_{9,3}$, $3 + \Delta_{9,3}$, $6 + \Delta_{9,3}$ |
| 10 | $l_0 + \Delta_{10,0}$ | $l_0 + \Delta_{10,1}$, $8 + \Delta_{10,1}$ | $l_0 + \Delta_{10,2}$, $4 + \Delta_{10,2}$, $8 + \Delta_{10,2}$ | $l_0 + \Delta_{10,3}$, $3 + \Delta_{10,3}$, $6 + \Delta_{10,3}$, $9 + \Delta_{10,3}$ |
| 11 | $l_0 + \Delta_{11,0}$ | $l_0 + \Delta_{11,1}$, $8 + \Delta_{11,1}$ | $l_0 + \Delta_{11,2}$, $4 + \Delta_{11,2}$, $8 + \Delta_{11,2}$ | $l_0 + \Delta_{11,3}$, $3 + \Delta_{11,3}$, $6 + \Delta_{11,3}$, $9 + \Delta_{11,3}$ |
| 12 | $l_0 + \Delta_{12,0}$ | $l_0 + \Delta_{12,1}$, $10 + \Delta_{12,1}$ | $l_0 + \Delta_{12,2}$, $5 + \Delta_{12,2}$, $10 + \Delta_{12,2}$ | $l_0 + \Delta_{12,3}$, $3 + \Delta_{12,3}$, $6 + \Delta_{12,3}$, $9 + \Delta_{12,3}$ |
| 13 | $l_0 + \Delta_{13,0}$ | $l_0 + \Delta_{13,1}$, $10 + \Delta_{13,1}$ | $l_0 + \Delta_{13,2}$, $5 + \Delta_{13,2}$, $10 + \Delta_{13,2}$ | $l_0 + \Delta_{13,3}$, $3 + \Delta_{13,3}$, $6 + \Delta_{13,3}$, $9 + \Delta_{13,3}$ |
| 14 | $l_0 + \Delta_{14,0}$ | $l_0 + \Delta_{14,1}$, $10 + \Delta_{14,1}$ | $l_0 + \Delta_{14,2}$, $5 + \Delta_{14,2}$, $10 + \Delta_{14,2}$ | $l_0 + \Delta_{14,3}$, $3 + \Delta_{14,3}$, $6 + \Delta_{14,3}$, $9 + \Delta_{14,3}$ |

For example, $l_0$ denotes a reference amount of a starting position of the DM-RS, a value of $l_0$ denotes a number in D symbols, and in Table 1, for example, it may be taken that $l_0=0$. Considering influence of the AGC and the guard period in the sidelink, the position of the DM-RS in looking up the table may be independence on the D symbols obtained above, rather than symbols contained in the entire non-slot. According to D, a value is taken for the number of the part of symbols in the lookup table, and the position the DM-RS is determined by a row to which D corresponds and a column in the table.

For example, if D=4, C=0, corresponding to $l_0+\Delta_{4,0}$ according to Table 1, it shows that the DM-RS occupies one symbol and is located at a position $l_0+\Delta_{4,0}$ in the D symbols, and a value of $l_0+\Delta_{i,j}$ denotes the number in the D symbols. For another example, if D=5, C=1, corresponding to $l_0+\Delta_{5,1}$ and $4+\Delta_{5,1}$ according to Table 1, it shows that the DM-RS occupies two symbols and is located at position $l_0+\Delta_{5,1}$ and $4+\Delta_{5,1}$ in the D symbols, and a value of $l_0+\Delta_{i,j}$ denotes the number in the D symbols.

Values of elements in Table 1 (such as $l_0+\Delta_{i,j}$, $x+\Delta_{i,j}$, etc., where, x=3, 4, 5, 6, 8, 9, 10) denotes the numbers in D symbols (not the numbers in the non-slot), that is, from 0 to D−1. For example, suppose N=14, F=1, E=1, then D=12, and numbers #1, #4, #7, #10 in D correspond to the numbers #2, #5, #8, #11 in N (non-slot), and so on. Which column is used is in dependence on the DM-RS number parameter C.

The parameter C may be pre-defined for numbers of each part of symbols, and the parameter C may also be configured by the network device. For example, it may be configured by the network device via at least one of a master information block (MIB) or system information block (SIB), radio resource control (RRC) signaling, and downlink control information (DCI).

$\Delta_{i,j}$ denotes offset performed in units of symbols, and for each combination of (D, C) values, a value of $\Delta_{i,j}$ may be independently configured and determined. $\Delta$ is greater than or equal to 0, and less than or equal to the number of symbols included in the slot or subframe; for example, $0 \leq \Delta_{i,j} \leq 14$. For a combination of values of N, E and F, only some rows in Table 1 may be available.

Table 2 is another example of a lookup table used for determining the DM-RS of the embodiment of this disclosure.

TABLE 2

| Number of a part of symbols (D) | Number parameters of DM-RSs (C) | |
|---|---|---|
| | 0 | 1 |
| 5 | $l_0 + \Delta_{5,0}$, $l_0 + 1 + \Delta_{5,0}$ | $l_0 + \Delta_{5,1}$, $l_0 + 1 + \Delta_{5,1}$ |
| 6 | $l_0 + \Delta_{6,0}$, $l_0 + 1 + \Delta_{6,0}$ | $l_0 + \Delta_{6,1}$, $l_0 + 1 + \Delta_{6,1}$ |
| 7 | $l_0 + \Delta_{7,0}$, $l_0 + 1 + \Delta_{7,0}$ | $l_0 + \Delta_{7,1}$, $l_0 + 1 + \Delta_{7,1}$ |
| 8 | $l_0 + \Delta_{8,0}$, $l_0 + 1 + \Delta_{8,0}$ | $l_0 + \Delta_{8,1}$, $l_0 + 1 + \Delta_{8,1}$, $5 + \Delta_{8,1}$, $6 + \Delta_{8,1}$ |
| 9 | $l_0 + \Delta_{9,0}$, $l_0 + 1 + \Delta_{9,0}$ | $l_0 + \Delta_{9,1}$, $l_0 + 1 + \Delta_{9,1}$, $5 + \Delta_{9,1}$, $6 + \Delta_{9,1}$ |
| 10 | $l_0 + \Delta_{10,0}$, $l_0 + 1 + \Delta_{10,0}$ | $l_0 + \Delta_{10,1}$, $l_0 + 1 + \Delta_{10,1}$, $7 + \Delta_{10,1}$, $8 + \Delta_{10,1}$ |
| 11 | $l_0 + \Delta_{11,0}$, $l_0 + 1 + \Delta_{11,0}$ | $l_0 + \Delta_{11,1}$, $l_0 + 1 + \Delta_{11,1}$, $7 + \Delta_{11,1}$, $8 + \Delta_{11,1}$ |
| 12 | $l_0 + \Delta_{12,0}$, $l_0 + 1 + \Delta_{12,0}$ | $l_0 + \Delta_{12,1}$, $l_0 + 1 + \Delta_{12,1}$, $9 + \Delta_{12,1}$, $10 + \Delta_{12,1}$ |
| 13 | $l_0 + \Delta_{13,0}$, $l_0 + 1 + \Delta_{13,0}$ | $l_0 + \Delta_{13,1}$, $l_0 + 1 + \Delta_{13,1}$, $9 + \Delta_{13,1}$, $10 + \Delta_{13,1}$ |
| 14 | $l_0 + \Delta_{14,0}$, $l_0 + 1 + \Delta_{14,0}$ | $l_0 + \Delta_{14,1}$, $l_0 + 1 + \Delta_{14,1}$, $9 + \Delta_{14,1}$, $10 + \Delta_{14,1}$ |

How to determine the DM-RS is schematically described above; however, this disclosure is not limited thereto. For example, Table 1 and Table 2 may be appropriately adjusted, and particular expressions or numeral values may be modified according to an actual scenario. A symbol taken as a guard period in the time-domain resource shall be described below.

In an LTE time division duplex (TDD) system, subframes that may be used by an LTE V2X sidelink may only be uplink subframes of the LTE TDD. More flexible TDD configuration and a slot format are introduced into a 5G NR system, in which uplink and downlink conversion may occur not only between slots (or subframes), but also may occur within a slot (or subframe).

If the V2X sidelink is still restricted to use entire uplink slot (or subframe), a V2X device will wait for arrival of a complete uplink slot (or subframe), thereby increasing a waiting time for sidelink transmission, which is not conducive to meet a requirement on low latency. For example, for a case where V2X and NR use the same frequency, by introducing non-slot, a V2X sidelink is able to use slots with only a part of uplink resources and complete uplink slots, thereby having more sidelink transmissions opportunities, which is helpful for reducing waiting time and lowering transmission latency.

In LTE V2X, one subframe contains 14 symbols, and a guard period occupies 1 symbol, hence, the guard period occupies 1/14 of the entire subframe. As the non-slot may contain fewer symbols and a proportion of the overhead of the guard period in the non-slot is higher than that of the LTE V2X, lowering the overhead of the guard period has a more significant effect on improving transmission efficiency of the non-slot sidelink.

It should be noted that all following uplink symbol (U), downlink symbol (D) and flexibly configured symbol (F) refer to cellular resource symbols, and a sidelink transmits on the uplink symbol (U) only.

In an embodiment, the sidelink time-domain resource includes multiple consecutive uplink symbols, and when a first symbol after the sidelink time-domain resource is a downlink symbol or a flexibly configured symbol, the time-domain resource doest no include a symbol taken as a guard period.

For example, the NR defines a variety of slot formats. For some slot formats, the non-slot used for sidelink transmission may have no guard period. That is, the non-slot may only include data symbols and DM-RS symbols, or may only include data symbols, DM-RS symbols and AGC symbols.

Figure 4:
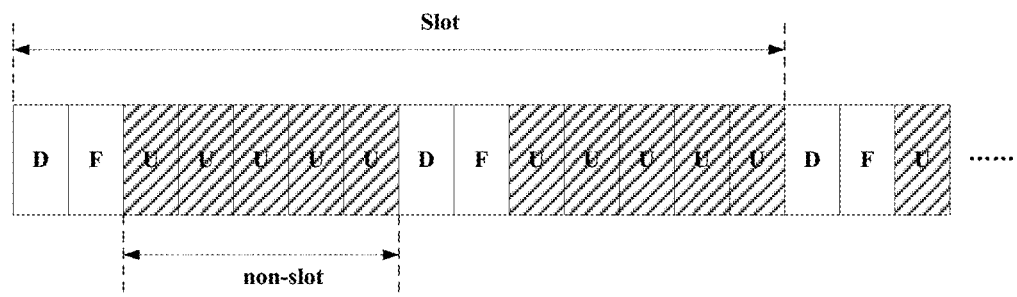
FIG. 4 is an exemplary diagram of a symbol taken as a guard period that is omitted of an embodiment of this disclosure.

FIG. 4 is an exemplary diagram of a symbol taken as a guard period that is omitted of the embodiment of this disclosure. As shown in FIG. 4, when a symbol immediately after the non-slot used for the sidelink (that is, a first symbol) is a downlink symbol (denoted by D in FIG. 4), the non-slot may not use a guard period.

Figure 5:
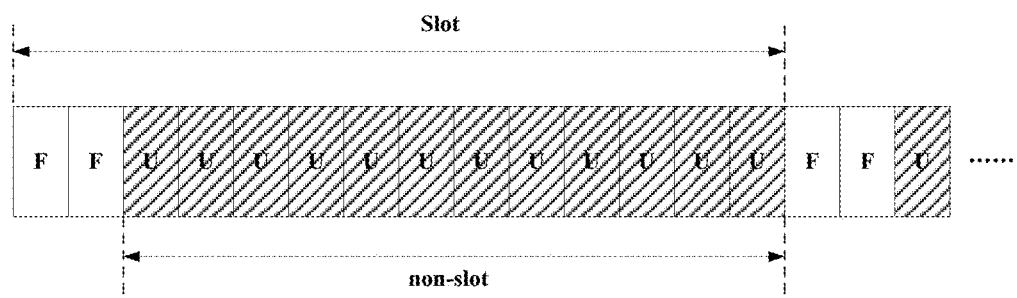
FIG. 5 is another exemplary diagram of the symbol taken as a guard period that is omitted of the embodiment of this disclosure.

FIG. 5 is another exemplary diagram of the symbol taken as a guard period that is omitted of the embodiment of this disclosure. As shown in FIG. 5, when a symbol immediately after the non-slot used for the sidelink (that is, a first symbol) is a flexibly configured symbol (which may be referred to as a flexible symbol, denoted by F in FIG. 5), the non-slot may not use a guard period.

In the cases shown in FIG. 4 or 5, for example, all symbols in the non-slot may be used for sidelink transmission. This is because the V2X device needs a guard period only during transfer from reception to transmission, and does not need to explicitly reserve a guard period during transfer from transmission to reception. By reducing the symbols used for the guard period in the non-slot, the resource utilization rate of the sidelink may be significantly improved.

In an embodiment, the sidelink time-domain resource includes multiple consecutive uplink symbols, and in a case where a first symbol after the sidelink time-domain resource is an uplink symbol and the uplink symbol does not belong to the sidelink time-domain resource (that is, the uplink symbol U is not used for sidelink transmission), the sidelink time-domain resource does not include a symbol taken as a guard period.

The above not using a guard period or not including a symbol taken as a guard period is also equivalent to that the sidelink time-domain resource includes: one or more symbols occupied by the data information and one or more symbols occupied by the demodulation reference signal, or, one or more symbols occupied by the data information, one or more symbols occupied by the demodulation reference signal and the at least one symbol used for automatic gain control.

Figure 6:
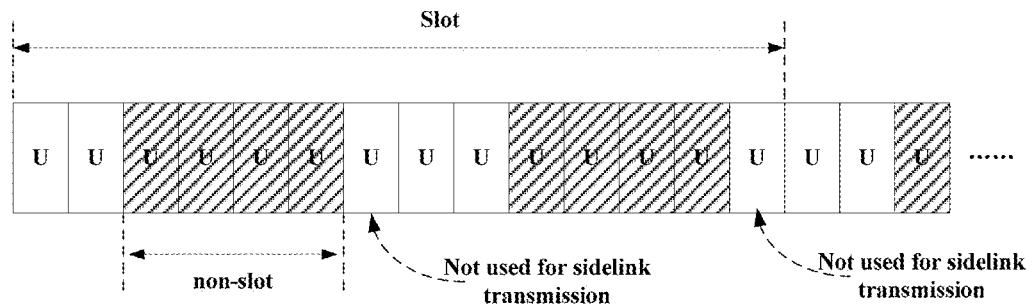
FIG. 6 is a further exemplary diagram of the symbol taken as a guard period that is omitted of the embodiment of this disclosure.

FIG. 6 is a further exemplary diagram of the symbol taken as a guard period that is omitted of the embodiment of this disclosure. As shown in FIG. 6, when a symbol immediately after the non-slot used for the sidelink (that is, a first symbol) is an uplink symbol (denoted by U in FIG. 6) and the uplink symbol is not used for sidelink transmission, the non-slot may not use a guard period.

For example, for a transmitting device outside a coverage of a network device, although the non-slot used for the sidelink is immediately followed by an uplink symbol for cellular communication, as the transmitting device does not need to transmit information to the network device, transfer of reception and transmission will not occur, hence, a guard period may not be used.

In an embodiment, multiple sidelink time-domain resources occupy consecutive symbols in the time domain, and a last sidelink time-domain resource includes a symbol taken as a guard period, while other sidelink time-domain resources do not include a symbol taken as a guard period.

For example, in order to meet requirements on higher reliabilities, the non-slot of the sidelink may be repeatedly transmitted. A last non-slot contains data symbols, DM-RS symbols, and guard period symbols, or contains data symbols, DM-RS symbols, AGC symbols and guard period symbols, and other non-slots may only contain data symbols and DM-RS symbols, or may only contain data symbols, DM-RS symbols and AGC symbols.

Figure 7:
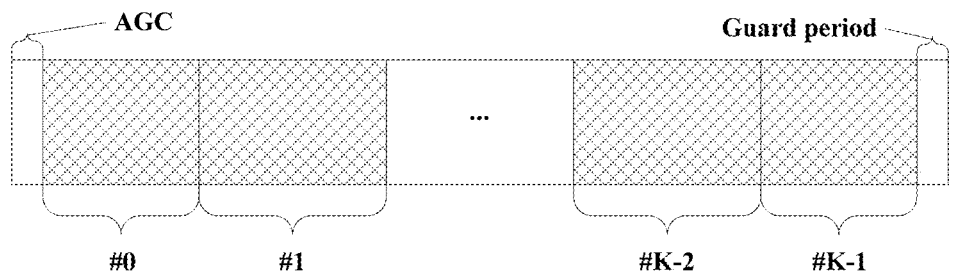
FIG. 7 is yet another exemplary diagram of the symbol taken as a guard period that is omitted of the embodiment of this disclosure.

FIG. 7 is yet another exemplary diagram of the symbol taken as a guard period that is omitted of the embodiment of this disclosure. As shown in FIG. 7, for example, when repeated K non-slots transmit by using consecutive time-domain resources, only a last non-slot (i.e. non-slot #K−1) needs to reserve a guard period, and other non-slots (non-slot #0 to non-slot #K−2) need not to reserve a guard period, that is, all symbols in these non-slots may be used for sidelink transmission.

The above schematically illustrates how to omit a guard period; however, this disclosure is not limited thereto. How to configure resources and how to transmit data information shall be described below.

Figure 8:
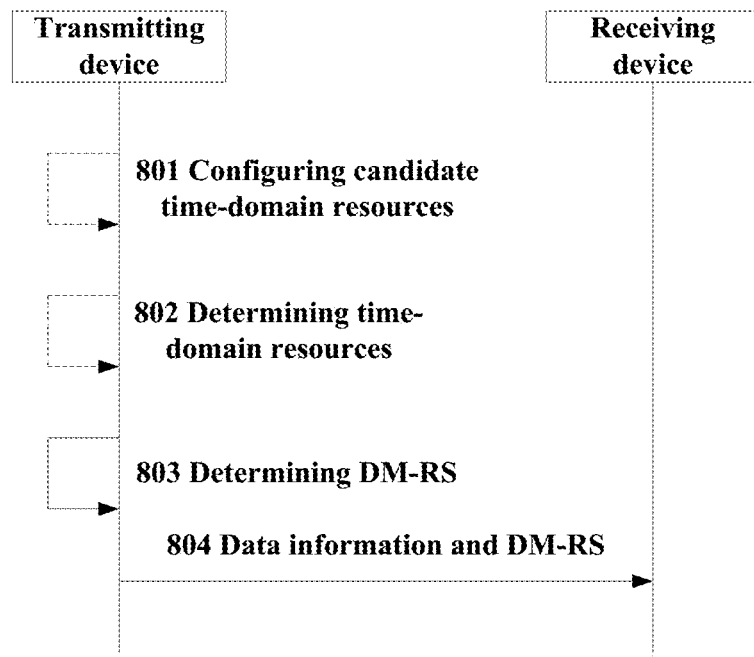
FIG. 8 is a schematic diagram of a method for information transmission and reception of an embodiment of this disclosure.

FIG. 8 is a schematic diagram of a method for information transmission and reception of the embodiment of this disclosure, which shall be described from a transmitting device side and a receiving device side. As shown in FIG. 8, the method may include:

step 801: configuring candidate time-domain resources in a plurality of slots or subframes.

In an embodiment, the candidate time-domain resources in the plurality of slots or subframes are determined according to a predefined rule, or are configured by a network device via one piece of the following information or signaling: a master information block, a system information block, radio resource control signaling, and downlink control information.

For example, in order to support non-slot in a sidelink, available non-slot resources, i.e. a non-slot resource pool, need to be configured for the sidelink. The configuration information may be transmitted by the network device via at least one of broadcast information (MIB/SIB), RRC signaling and DCI signaling. That is, M candidate non-slots may be preconfigured.

In an embodiment, candidate time-domain resources in a starting slot or subframe may be configured via an initial time-domain resource indication and a first period parameter, and then the candidate time-domain resources in the plurality of slots or subframes are obtained by repeating the starting slot or subframe with a period of subframe or slot.

Figure 9:
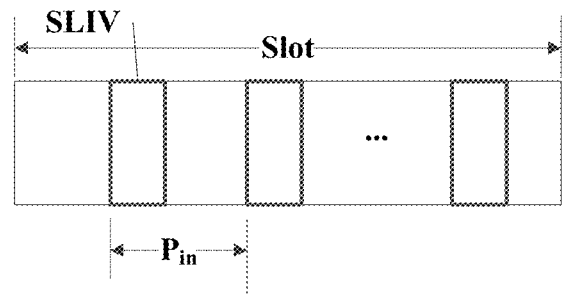
FIG. 9 is an exemplary diagram of a candidate time-domain resource configuration of an embodiment of this disclosure.

FIG. 9 is an exemplary diagram of a candidate time-domain resource configuration of the embodiment of this disclosure. As shown in FIG. 9, the configuration information may include a start and length indicator value (SLIV, initial time-domain resource indication) and $P_{in}$ (a first period parameter).

For example, the SLIV and $P_{in}$ are used for determining candidate non-slots within a starting slot, and then repeated in units of slots to obtain candidate non-slots in a plurality of slot. The SLIV is used for indicating a first candidate non-slot within the starting slot, and then repeated within the slot in unit of $P_{in}$ to obtain other non-slots within the slot. Reference may be made to definitions in sub-section 6.1.2.1 in TS 38.213 for an implementation of the SLIV.

In another embodiment, the candidate time-domain resources in the plurality of slots or subframes may be configured via a plurality of initial time-domain resource indications, then the starting slot or subframe is repeated in a period of slot or subframe to obtain the candidate time-domain resources in the plurality of slots or subframes.

Figure 10:
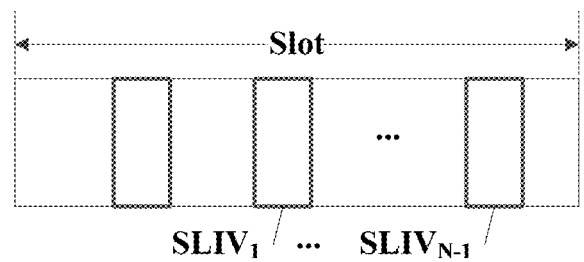
FIG. 10 is another exemplary diagram of the candidate time-domain resource configuration of the embodiment of this disclosure.

FIG. 10 is an exemplary diagram of the candidate time-domain resource configuration of the embodiment of this disclosure. As shown in FIG. 10, the configuration information may include a plurality SLIVs (time-domain resource indications).

For example, at least one SLIV is used for determining at least one candidate non-slot within a staring slot, and then is repeated in unit of slot to obtain candidate non-slots within a plurality of slots.

In a further embodiment, candidate time-domain resources in the plurality of slots or subframes may be determined via an initial time-domain resource indication and a second period parameter.

Figure 11:
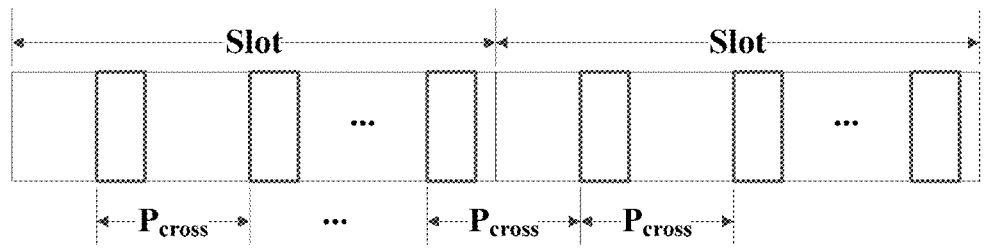
FIG. 11 is a further exemplary diagram of the candidate time-domain resource configuration of the embodiment of this disclosure.

FIG. 11 is a further exemplary diagram of the candidate time-domain resource configuration of the embodiment of this disclosure. As shown in FIG. 11, the configuration information includes SLIV (initial time-domain resource indication) and $P_{cross}$ (second period parameter).

For example, SLIV and $P_{cross}$ are used to determine candidate non-slots in multiple slots. The SLIV is used to indicate a first candidate non-slot in the starting slot, and is repeated in a period of $P_{cross}$. Such a process of repetition may be performed in an across slot manner, and candidate non-slots in a plurality of slots may be obtained.

It should be noted that the above starting slot may be slot #0 of frame #0, and may also be a configured slot. When the starting slot is a configured slot, the above configuration information further includes an indication of a starting slot position. Furthermore, candidate non-slots may also be determined by pre-defining. For example, each slot is divided into S candidate non-slots in advance, and the above M candidate non-slots are a set of candidate non-slots in a plurality of slots.

As shown in FIG. 8, the method may include:
step 802: determining time-domain resources in a plurality of slots or subframes from candidate time-domain resources.

In an embodiment, the candidate time-domain resources in the plurality of slots or subframes may be determined by the transmitting device and the receiving device according to a predefined rule, or may be determined by the network device by indicating to the transmitting device and the receiving device via a bitmap.

For example, the bitmap may be configured by the network device via one piece of the following information or signaling: an MIB, a SIB, RRC signaling, and DCI; however, this disclosure is not limited thereto.

FIG. 12 is an exemplary diagram of determining a time-domain resource of the embodiment of this disclosure. As shown in FIG. 12, for example, after configuring M candidate non-slots, a bitmap of a length B may be used to determine available non-slots in the M candidate non-slots. Each bit in the bitmap corresponds to a candidate non-slot. For example, a bit being 1 indicates that the non-slot may be used for sidelink transmission, and a bit being 0 indicates that it is not used for sidelink transmission. For another example, when B=M, each bit corresponds to a non-slot one-to-one; and when B<M, non-slot #m corresponds to bit #b in the bitmap; where, b=mod(M, B), 0≤m≤M−1.

As shown in FIG. 8, the method further includes:
step 803: determining a demodulation reference signal in the time-domain resource by the transmitting device at least according to the number of a part of symbols in the time-domain resource; and
step 804: transmitting data information and the demodulation reference signal by the transmitting device to the receiving device by using at least the time-domain resource.

It should be noted that FIG. 8 only schematically illustrate the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 8.

The above embodiments or implementations only illustrate the embodiment of this disclosure. However, this disclosure is not limited thereto, and appropriate variants may be made on the basis of these implementation. For example, the above implementations may be executed separately, or one or more of them may be executed in a combined manner.

It can be seen from the above embodiments that the transmitting device determines a demodulation reference signal in a time-domain resource at least according to the number of a part of symbols in the time-domain resource; wherein the number of symbols contained in the time-domain resource is less than or equal to the number of symbols contained in a slot or a subframe. Hence, data information transmission of non-slot may be supported.

Embodiment 2

The embodiments of this disclosure provide a method for information reception, which is described from a receiving device side. The receiving device may be a terminal equipment; however, this disclosure is not limited thereto, and, for example, it may also be a network device.

FIG. 13 is a schematic diagram of a method for information reception of the embodiment of this disclosure, in which a case at a receiving device side is shown. As shown in FIG. 13, the method includes:
step 1301: a receiving device receives data information and a demodulation reference signal transmitted by a transmitting device by at least using a time-domain resource; wherein the demodulation reference signal is determined at least according to the number of a part of symbols in the time-domain resource, and the number of symbols contained in the time-domain resource is less than or equal to the number of symbols contained in a slot or a subframe.

In an embodiment, the number of a part of symbols in the time-domain resource may be the number of symbols in the time-domain resource except at least one symbol used for automatic gain control and/or at least one symbol taken as a guard period.

It should be noted that FIG. 13 only schematically illustrate the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 13.

The above embodiments or implementations only illustrate the embodiment of this disclosure. However, this disclosure is not limited thereto, and appropriate variants may be made on the basis of these implementation. For example, the above implementations may be executed separately, or one or more of them may be executed in a combined manner.

It can be seen from the above embodiments that the transmitting device determines a demodulation reference signal in a time-domain resource at least according to the number of a part of symbols in the time-domain resource; wherein the number of symbols contained in the time-domain resource is less than or equal to the number of symbols contained in a slot or a subframe. Hence, data information transmission of non-slot may be supported.

Embodiment 3

The embodiments of this disclosure provide an apparatus for information transmission. The apparatus may be, for example, a terminal equipment, and may also be one or more components or assemblies configured in a terminal equipment. However, this disclosure is not limited thereto, and for example, it may also be a network device, or one or more components or assemblies configured in a network device. Contents in the embodiments identical to those in Embodiment 1 shall not be described herein any further.

FIG. 14 is a schematic diagram of an apparatus for information transmission of the embodiment of this disclosure. As shown in FIG. 14, an apparatus for information transmission 1400 includes:

a signal determining unit 1401 configured to determine a demodulation reference signal in a time-domain resource at least according to the number of a part of symbols in the time-domain resource; wherein the number of symbols contained in the time-domain resource is less than or equal to the number of symbols contained in a slot or a subframe; and an information transmitting unit 1402 configured to transmit data information and the demodulation reference signal to a receiving device by at least using the time-domain resource.

As shown in FIG. 14, the apparatus for information transmission 1400 may further include:

a candidate configuring unit 1403 configured to configure candidate time-domain resources in a plurality of slots or subframes.

As shown in FIG. 14, the apparatus for information transmission 1400 may further include:

a resource determining unit 1404 configured to determine time-domain resources in a plurality of slots or subframes from the candidate time-domain resources.

It should be noted that the components or modules related to this disclosure are only described above. However, this disclosure is not limited thereto, and the apparatus for information transmission 1400 may further include other components or modules, and reference may be made to related techniques for particulars of these components or modules.

Furthermore, for the sake of simplicity, connection relationships between the components or modules or signal profiles thereof are only illustrated in FIG. 14. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the transmitting device determines a demodulation reference signal in a time-domain resource at least according to the number of a part of symbols in the time-domain resource; wherein the number of symbols contained in the time-domain resource is less than or equal to the number of symbols contained in a slot or a subframe. Hence, data information transmission of non-slot may be supported.

Embodiment 4

The embodiments of this disclosure provide an apparatus for information reception. The apparatus may be, for example, a terminal equipment, and may also be one or more components or assemblies configured in a terminal equipment. However, this disclosure is not limited thereto, and for example, it may also be a network device, or one or more components or assemblies configured in a network device. Contents in the embodiments identical to those in Embodiment 2 shall not be described herein any further.

Figure 15:
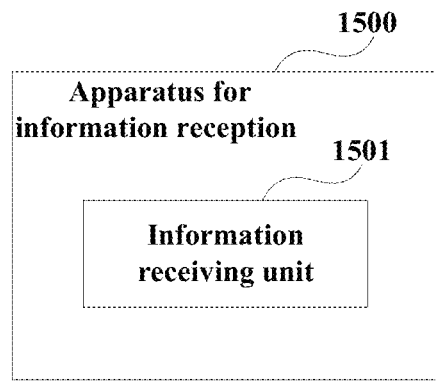
FIG. 15 is a schematic diagram of an apparatus for information reception of an embodiment of this disclosure.

FIG. 15 is a schematic diagram of an apparatus for information reception of an embodiment of this disclosure. As shown in FIG. 15, an apparatus for information reception 1500 includes:

an information receiving unit 1501 configured to receive data information and a demodulation reference signal transmitted by a transmitting device by at least using a time-domain resource; wherein, the demodulation reference signal is determined at least according to the number of a part of symbols in the time-domain resource, and the number of symbols contained in the time-domain resource is less than or equal to the number of symbols contained in a slot or a subframe.

It should be noted that the components or modules related to this disclosure are only described above. However, this disclosure is not limited thereto, and the apparatus for information reception 1500 may further include other components or modules, and reference may be made to related techniques for particulars of these components or modules.

Furthermore, for the sake of simplicity, connection relationships between the components or modules or signal profiles thereof are only illustrated in FIG. 15. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the transmitting device determines a demodulation reference signal in a time-domain resource at least according to the number of a part of symbols in the time-domain resource; wherein the number of symbols contained in the time-domain resource is less than or equal to the number of symbols contained in a slot or a subframe. Hence, data information transmission of non-slot may be supported.

Embodiment 5

The embodiments of this disclosure provide a communication system, and reference may be made to FIG. 1, with contents identical to those in embodiments 1-4 being not going to be described herein any further. In an embodiment, a communication system 100 may include:

a terminal equipment 102 configured with the apparatus for information transmission 1400 as described in Embodiment 3 or the apparatus for information reception 1500 as described in Embodiment 4; and a network device 101 configured to provide services to the terminal equipment 102.

The embodiment of this disclosure further provides a network device, which may be, for example, a base station. However, this disclosure is not limited thereto, and it may also be another network device.

Figure 16:
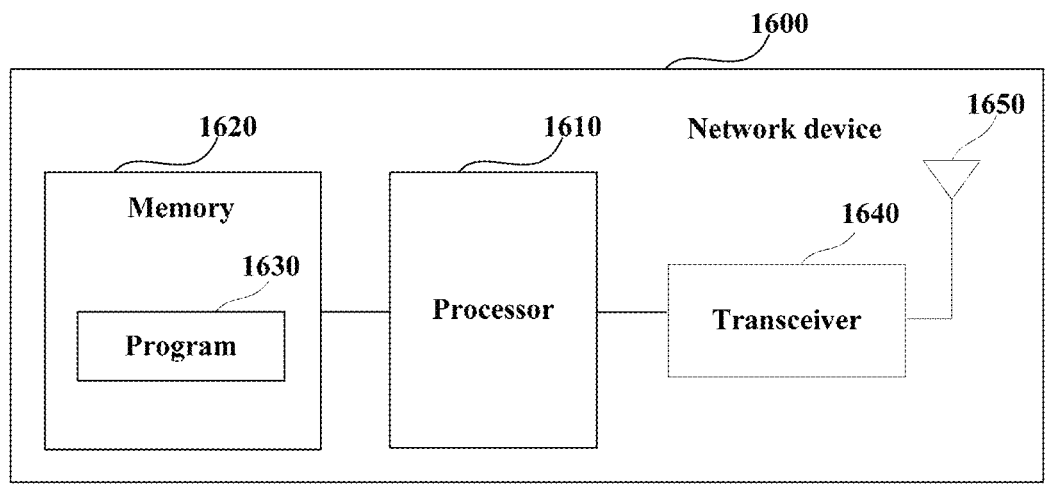
FIG. 16 is a schematic diagram of the network device of an embodiment of this disclosure.

FIG. 16 is a schematic diagram of a structure of the network device of the embodiment of this disclosure. As shown in FIG. 16, a network device 1600 may include a processor 1610 (such as a central processing unit (CPU)) and a memory 1620, the memory 1620 being coupled to the processor 1610. The memory 1620 may store various data, and furthermore, it may store a program 1630 for data processing, and execute the program 1630 under control of the processor 1610.

Furthermore, as shown in FIG. 16, the network device 1600 may include a transceiver 1640, and an antenna 1650, etc. Functions of the above components are similar to those in the relevant art, and shall not be described herein any further. It should be noted that the network device 1600 does not necessarily include all the parts shown in FIG. 16, and furthermore, the network device 1600 may include parts not shown in FIG. 16, and the relevant art may be referred to.

The embodiment of this disclosure further provides a terminal equipment, however, this disclosure is not limited thereto, and it may also be another equipment.

Figure 17:
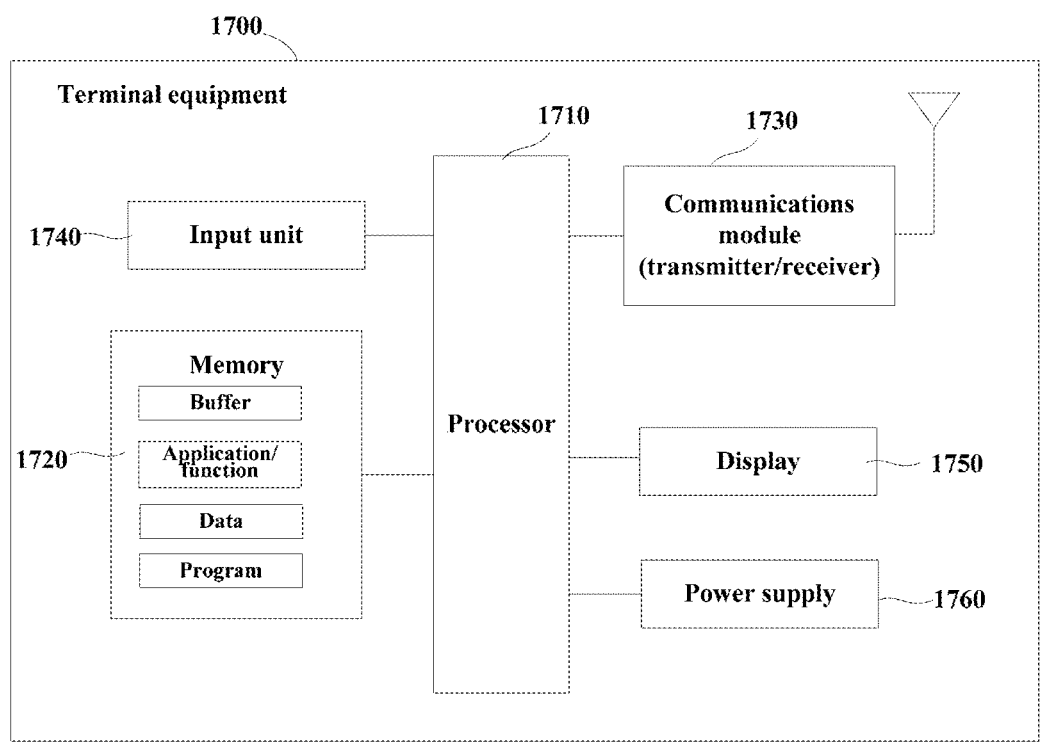
FIG. 17 is a schematic diagram of the terminal equipment of an embodiment of this disclosure.

FIG. 17 is a schematic diagram of the terminal equipment of the embodiment of this disclosure. As shown in FIG. 17, a terminal equipment 1700 may include a processor 1710 and a memory 1720, the memory 1720 storing data and a program and being coupled to the processor 1710. It should be noted that his figure is illustrative only, and other types of structures may also be used, so as to supplement or replace this structure and achieve a telecommunications function or other functions.

For example, the processor 1710 may be configured to execute a program to carry out the method for data transmission described in Embodiment 1. For example, the processor 1710 may be configured to execute the following control: determining a demodulation reference signal in a time-domain resource at least according to the number of a part of symbols in the time-domain resource; wherein the number of symbols contained in the time-domain resource is less than or equal to the number of symbols contained in a slot or a subframe; and transmitting data information and the demodulation reference signal to a receiving device by at least using the time-domain resource.

For another example, the processor 1710 may be configured to execute the program to carry out the method for data reception described in Embodiment 2. For example, the processor 1710 may be configured to execute the following control: receiving data information and a demodulation reference signal transmitted by a transmitting device by at least using a time-domain resource; wherein, the demodulation reference signal is determined at least according to the number of a part of symbols in the time-domain resource, and the number of symbols contained in the time-domain resource is less than or equal to the number of symbols contained in a slot or a subframe.

As shown in FIG. 17, the terminal equipment 1700 may further include a communication module 1730, an input unit 1740, a display 1750, and a power supply 1760; wherein functions of the above components are similar to those in the relevant art, which shall not be described herein any further. It should be noted that the terminal equipment 1700 does not necessarily include all the parts shown in FIG. 17, and the above components are not necessary. Furthermore, the terminal equipment 1700 may include parts not shown in FIG. 17, and the relevant art may be referred to.

An embodiment of the present disclosure provides a computer readable program code, which, when executed in a network device, will cause the network device to carry out the method for data transmission described in Embodiment 1 or the method for data reception described in Embodiment 2.

An embodiment of this disclosure provides a computer readable medium, including a computer readable program code, which will cause a network device to carry out the method for data transmission described in Embodiment 1 or the method for data reception described in Embodiment 2.

An embodiment of the present disclosure provides a computer readable program code, which, when executed in a terminal equipment, will cause the terminal equipment to carry out the method for data transmission described in Embodiment 1 or the method for data reception described in Embodiment 2.

An embodiment of this disclosure provides a computer readable medium, including a computer readable program code, which will cause a terminal equipment to carry out the method for data transmission described in Embodiment 1 or the method for data reception described in Embodiment 2.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

Supplement 1. A method for information transmission, including:
- determining a demodulation reference signal in a time-domain resource by a transmitting device at least according to the number of a part of symbols in the time-domain resource; wherein the number of symbols contained in the time-domain resource is less than or equal to the number of symbols contained in a slot or a subframe; and
- transmitting data information and the demodulation reference signal by the transmitting device to a receiving device by at least using the time-domain resource.

Supplement 2. The method according to supplement 1, wherein the time-domain resource includes one or more symbols occupied by the data information and one or more symbols occupied by the demodulation reference signal.

Supplement 3. The method according to supplement 2, wherein the time-domain resource further includes at least one symbol used for automatic gain control and/or at least one symbol taken as a guard period.

Supplement 4. The method according to any one of supplements 1-3, wherein the time-domain resource is used for transmission or reception of sidelink information;

Supplement 5. The method according to any one of supplements 1-4, wherein the number of a part of symbols in the time-domain resource is the number of symbols in the time-domain resource except at least one symbol used for automatic gain control and/or at least one symbol taken as a guard period.

Supplement 6. The method according to any one of supplements 1-5, wherein,
- the transmitting device determine the number of symbols occupied by the demodulation reference signal and positions of the symbols where they are located in the time-domain resource at least according to the number of a part of symbols in the time-domain resource.

Supplement 7. The method according to supplement 6, wherein the number of symbols occupied by the demodulation reference signal and the positions of the symbols where they are located are determined according to parameters D, C and Δ;
- where, D is the number of a part of symbols in the time-domain resource, C is a number parameter of the demodulation reference signal, and A denotes offset taking symbol as a unit.

Supplement 8. The method according to supplement 7, wherein the number parameter of the demodulation reference signal is predefined, or is configured by a network device via one piece of the following information or signaling: a master information block, a system information block, radio resource control signaling, and downlink control information.

Supplement 9. The method according to supplement 7 or 8, wherein for each combination of D and C, Δ is configured or determined independently.

Supplement 10. The method according to any one of supplements 7-9, wherein A is greater than or equal to 0 and less than or equal to the number of symbols contained in the slot or the subframe.

Supplement 11. The method according to any one of supplements 1-10, wherein the number of the symbols included in the slot or subframe is 14.

Supplement 12. The method according to supplement 4, wherein a sidelink time-domain resource includes a plurality of consecutive uplink symbols;
- and in a case where a first symbol after the sidelink time-domain resources is a downlink symbol or a flexibly configured symbol, the sidelink time-domain resource includes one or more symbols occupied by the data information and one or more symbols occupied by the demodulation reference signal, or includes one or more symbols occupied by the data information, one or more symbols occupied by the demodulation reference signal and the at least one symbol used for automatic gain control.

Supplement 13. The method according to supplement 4, wherein a sidelink time-domain resource includes a plurality of consecutive uplink symbols;
- and in a case where a first symbol after the sidelink time-domain resources is a downlink symbol or a flexibly configured symbol, the sidelink time-domain resource does not include a symbol taken as a guard period.

Supplement 14. The method according to supplement 4, wherein a sidelink time-domain resource includes a plurality of consecutive uplink symbols;
- and in a case where a first symbol after the sidelink time-domain resources is an uplink symbol and the uplink symbol does not belong to a sidelink time-domain resource, the sidelink time-domain resource includes one or more symbols occupied by the data information and one or more symbols occupied by the demodulation reference signal, or includes one or more symbols occupied by the data information, one or more symbols occupied by the demodulation reference signal and the at least one symbol used for automatic gain control.

Supplement 15. The method according to supplement 4, wherein a sidelink time-domain resource includes a plurality of consecutive uplink symbols;
- and in a case where a first symbol after the sidelink time-domain resources is an uplink symbol and the uplink symbol does not belong to a sidelink time-domain resource, the sidelink time-domain resource does not include a symbol taken as a guard period.

Supplement 16. The method according to supplement 4, wherein a plurality of sidelink time-domain resources occupy consecutive symbols in the time domain; a final sidelink time-domain resource includes one or more symbols occupied by the data information, one or more symbols occupied by the demodulation reference signal, the at least one symbol used for automatic gain control and/or the at least one symbol taken as a guard period;
- and other sidelink time-domain resources include one or more symbols occupied by the data information and one or more symbols occupied by the demodulation reference signal, or includes one or more symbols occupied by the data information, one or more symbols occupied by the demodulation reference signal and the at least one symbol used for automatic gain control.

Supplement 17. The method according to supplement 4, wherein a plurality of sidelink time-domain resources occupy consecutive symbols in the time domain; a final sidelink time-domain resource includes a symbol taken as a guard period, and other sidelink time-domain resources do not include a symbol taken as a guard period.

Supplement 18. The method according to any one of supplements 1-17, wherein method further includes:
configuring candidate time-domain resources in a plurality of slots or subframes.

Supplement 19. The method according to supplement 18, wherein the candidate time-domain resources in the plurality of slots or subframes are determined according to a predefined rule, or are configured by a network device via one piece of the following information or signaling: a master information block, a system information block, radio resource control signaling, and downlink control information.

Supplement 20. The method according to supplement 18 or 19, wherein candidate time-domain resources in a starting slot or subframe are configured via an initial time-domain resource indication and a first period parameter.

Supplement 21. The method according to supplement 18 or 19, wherein candidate time-domain resources in a starting slot or subframe are configured via a plurality of time-domain resource indications.

Supplement 22. The method according to supplement 20 or 21, wherein method further includes:
obtaining the candidate time-domain resources in the plurality of slots or subframes by repeating the starting slot or subframe with a period of subframe or slot.

Supplement 23. The method according to supplement 18 or 19, wherein the candidate time-domain resources in the plurality of slots or subframes are configured via an initial time-domain resource indication and a second period parameter.

Supplement 24. The method according to any one of supplements 18-23, wherein the method further includes:
determining time-domain resources in a plurality of slots or subframes from the candidate time-domain resources.

Supplement 25. The method according to supplement 24, wherein the time-domain resources in the plurality of slots or subframes are determined by the transmitting device and receiving device according to a predefined rule, or are determined by indicating to the transmitting device and/or the receiving device by a network device via a bitmap.

Supplement 26. The method according to supplement 25, wherein the bitmap is configured by the network device via one piece of the following information or signaling: a master information block, a system information block, radio resource control signaling, and downlink control information.

Supplement 27. An information reception method, including:
receiving, by a receiving device, data information and a demodulation reference signal transmitted by a transmitting device by at least using a time-domain resource;
wherein, the demodulation reference signal is determined at least according to the number of a part of symbols in the time-domain resource, and the number of symbols contained in the time-domain resource is less than or equal to the number of symbols contained in a slot or a subframe.

Supplement 28. The method according to supplement 27, wherein the number of a part of symbols in the time-domain resource is the number of symbols in the time-domain resource except at least one symbol used for automatic gain control and/or at least one symbol taken as a guard period.

Supplement 29. A network device, including a memory and a processor, the memory storing a computer program, and the processor being configured to execute the computer program to carry out the method as described in any one of supplements 1-28.

Supplement 30. A terminal equipment, including a memory and a processor, the memory storing a computer program, and the processor being configured to execute the computer program to carry out the method as described in any one of supplements 1-28.

What is claimed is:

1. An apparatus for information transmission, comprising:
a processor configured to determine a demodulation reference signal in a time-domain resource, wherein the number of symbols contained in the time-domain resource is less than or equal to the number of symbols contained in a slot or a subframe, wherein the number of symbols are occupied by the demodulation reference signal and positions where the symbols are located in the time-domain resource are determined by the processor circuitry according to a first parameter, a second parameters and a third parameter, where, the first parameter is the number of a part of symbols in the time-domain resource, the second parameter is a number parameter of the demodulation reference signal, and the third parameter denotes offset taking symbol as a unit; and
a transmitter configured to transmit data information and the determined demodulation reference signal by at least using the time-domain resource to a receiving device.

2. The apparatus according to claim 1, wherein the time-domain resource comprises one or more symbols occupied by the data information and one or more symbols occupied by the demodulation reference signal.

3. The apparatus according to claim 2, wherein the time-domain resource further comprises at least one symbol used for automatic gain control and/or at least one symbol taken as a guard period.

4. The apparatus according to claim 1, wherein the time-domain resource is used for transmission or reception of sidelink information;
and the number of a part of symbols in the time-domain resource is the number of symbols in the time-domain resource except at least one symbol used for automatic gain control and/or at least one symbol taken as a guard period.

5. The apparatus according to claim 1, wherein the number parameter of the demodulation reference signal is predefined, or is configured by a network device via one piece of the following information or signaling: a master information block, a system information block, radio resource control signaling, and downlink control information.

6. The apparatus according to claim 1, wherein for each combination of the first parameter and the second parameter, the third parameter is configured or determined independently, and the third parameter is greater than or equal to 0 and less than or equal to the number of symbols contained in the slot or the subframe.

7. The apparatus according to claim 4, wherein a sidelink time-domain resource comprises a plurality of consecutive uplink symbols;
and in a case where a first symbol after the sidelink time-domain resources is a downlink symbol or a flexibly configured symbol, or a first symbol after the sidelink time-domain resources is an uplink symbol and the uplink symbol is not a sidelink time-domain resource, the sidelink time-domain resource comprises one or more symbols occupied by the data information and one or more symbols occupied by the demodulation reference signal, or comprises one or more symbols occupied by the data information, one or more symbols occupied by the demodulation reference signal and the at least one symbol used for automatic gain control.

8. The apparatus according to claim 4, wherein a plurality of sidelink time-domain resources occupy consecutive symbols in the time domain;
   a final sidelink time-domain resource comprises one or more symbols occupied by the data information, one or more symbols occupied by the demodulation reference signal, the at least one symbol used for automatic gain control and/or the at least one symbol taken as a guard period;
   and other sidelink time-domain resources comprise one or more symbols occupied by the data information and one or more symbols occupied by the demodulation reference signal, or comprises one or more symbols occupied by the data information, one or more symbols occupied by the demodulation reference signal and the at least one symbol used for automatic gain control.

9. The apparatus according to claim 1, wherein the processor circuitry is further configured to configure candidate time-domain resources in a plurality of slots or subframes.

10. The apparatus according to claim 9, wherein the candidate time-domain resources in the plurality of slots or subframes are determined according to a predefined rule, or are configured by a network device via one piece of the following information or signaling: a master information block, a system information block, radio resource control signaling, and downlink control information.

11. The apparatus according to claim 9, wherein the processor circuitry is configured to configure candidate time-domain resources in a starting slot or subframe via an initial time-domain resource indication and a first period parameter, or to configure candidate time-domain resources in a starting slot or subframe via a plurality of time-domain resource indications.

12. The apparatus according to claim 11, wherein the processor circuitry is further configured to obtain the candidate time-domain resources in the plurality of slots or subframes by repeating the starting slot or subframe with a period of subframe or slot.

13. The apparatus according to claim 9, wherein the processor circuitry is configured to configure the candidate time-domain resources in the plurality of slots or subframes via an initial time-domain resource indication and a second period parameter.

14. The apparatus according to claim 9, wherein the processor circuitry is further configured to determine time-domain resources in a plurality of slots or subframes from the candidate time-domain resources.

15. The apparatus according to claim 14, wherein the time-domain resources in the plurality of slots or subframes are determined by a transmitting device and a receiving device according to a predefined rule, or are determined by indicating to the transmitting device and/or the receiving device by a network device via a bitmap.

16. The apparatus according to claim 15, wherein the bitmap is configured by the network device via one piece of the following information or signaling: a master information block, a system information block, radio resource control signaling, and downlink control information.

17. An apparatus for information reception, comprising:
   a receiver configured to receive data information and a demodulation reference signal transmitted by a transmitting device by at least using a time-domain resource;
   wherein, the demodulation reference signal is determined by the transmitting device, and the number of symbols contained in the time-domain resource is less than or equal to the number of symbols contained in a slot or a subframe; wherein the number of symbols occupied by the demodulation reference signal and positions where the symbols are located in the time-domain resource are determined according to a first parameter, a second parameter and a third parameter; and
   where, the first parameter is the number of a part of symbols in the time-domain resource, the second parameter is a number parameter of the demodulation reference signal, and the third parameter denotes offset taking symbol as a unit.

18. A communication system, comprising:
   a transmitting device, comprising an apparatus for information transmission comprising
   processor circuitry configured to determine a demodulation reference signal in a time-domain resource, wherein the number of symbols contained in the time-domain resource is less than or equal to the number of symbols contained in a slot or a subframe, wherein the number of symbols are occupied by the demodulation reference signal and positions where the symbols are located in the time-domain resource are determined according to a first parameter, a second parameter and a third parameter, where, the first parameter is the number of a part of symbols in the time-domain resource, the second parameter is a number parameter of the demodulation reference signal, and the third parameter denotes offset taking symbol as a unit; and
   a transmitter configured to transmit data information and the determined demodulation reference signal to a receiving device by at least using the time-domain resource; and
   a receiving device, comprising
   a receiver configured to receive data information and the demodulation reference signal transmitted by the transmitting device by at least using the time-domain resource.

* * * * *